C. T. MADSEN.
SAW SET.
APPLICATION FILED NOV. 22, 1917.
1,294,817.
Patented Feb. 18, 1919.
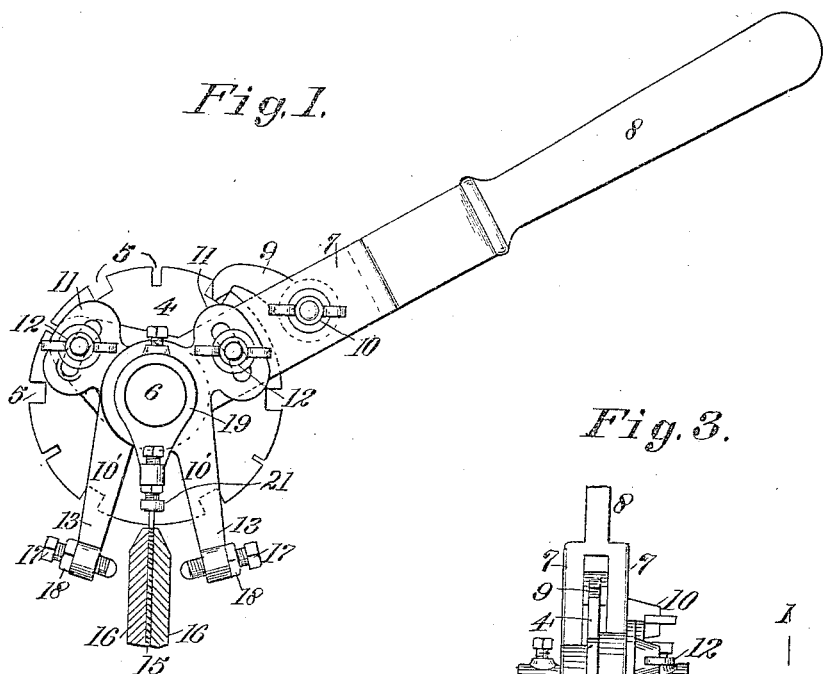
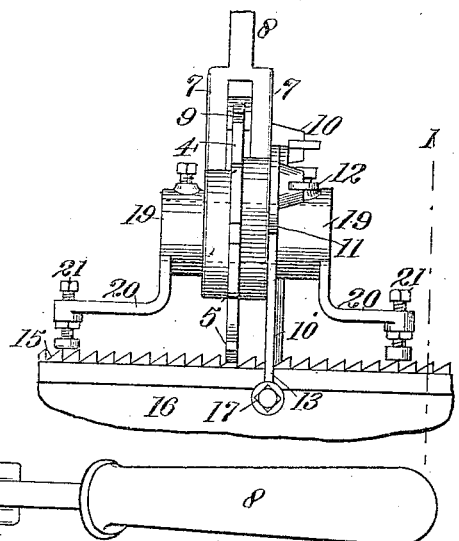
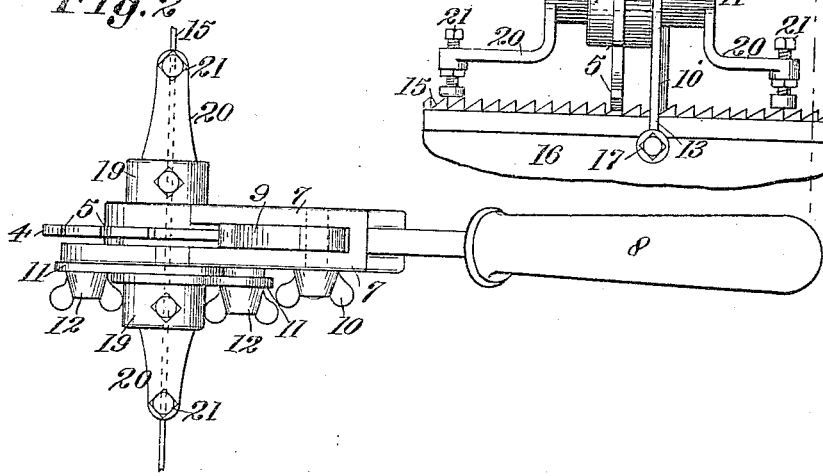
WITNESS:
Charles Pickles
J. H. Herring
INVENTOR.
Chresten T. Madsen
BY
Strong & Townsend
ATTORNEYS.

UNITED STATES PATENT OFFICE.

CHRESTEN TORBEN MADSEN, OF OAKLAND, CALIFORNIA.

SAW-SET.

1,294,817. Specification of Letters Patent. Patented Feb. 18, 1919.

Application filed November 22, 1917. Serial No. 203,438.

*To all whom it may concern:*

Be it known that I, CHRESTEN T. MADSEN, a citizen of the United States, residing at Oakland, in the county of Alameda and State of California, have invented new and useful Improvements in Saw-Sets, of which the following is a specification.

This invention relates to saw sets; and has for its object to simplify and improve the construction and operation of devices of this sort.

In carrying out the invention, a disk, preferably made of hardened steel, having at spaced intervals about its periphery a plurality of notches of suitable sizes to snugly engage saw teeth of various dimensions, is carried between the forked ends of a handle and adjustably fixed relatively thereto. Means are thus provided to bring any one of the notches into operative position, so that pressure applied to the handle will operate to set a saw tooth engaged in said notch. In order to regulate the set thus given to the tooth, a pair of stop members having arms projecting beyond the disk in a manner to straddle the saw is adjustably secured to the handle. Means are also provided to hold the disk in proper position on the saw, said means comprising a pair of outwardly extending arms slidably engaging the saw teeth on either side of the tooth being set.

A preferred form of the invention is shown in the accompanying drawings, in which—

Figure 1 is a side elevation of the device.

Fig. 2 is a plan view of the saw set.

Fig. 3 is a front elevation of the same.

As shown in Fig. 1, a disk 4 is provided at spaced intervals about its periphery with a plurality of notches 5. These notches are formed with various widths and depths so that they may firmly engage saw teeth of different sizes. The disk 4 is rotatably carried on a spindle 6 extending through the ends of a pair of arms 7 formed at one end of a suitable handle 8. A pointed pawl 9, carried by the handle 8, is journaled on a thumb screw 10, by which it may be held into engagement with any of the notches 5 to fix the position of the disk 4 relatively to the handle 8. By this arrangement it is possible to adjust the tool to set teeth of different dimensions by simply bringing the proper sized notch into operative position.

To regulate the amount of set to be given to the saw teeth, stop members 10' are journaled on the spindle 6 adjacent to one of the arms 7 and adjustably secured thereto by means of thumb screws 12 carried on said arms 7 and extending through slotted extensions 11 formed on the stop members 10'. Projections 13 are also formed on said stop members and extend beyond the edges of the disk in a manner to straddle a saw 15, as shown in Fig. 1. Adjustable contact members, preferably set screws such as those shown at 17, are carried by the ends of the projections 13 in a manner to contact with the sides of the saw 15 or of the vise 16 in which the saw is held. By means of lock nuts 18 the set screws 17 may be secured in any desired position, it being obvious that by extending or retracting the adjustable contact members the arc through which handle 8 may be moved in setting the saw teeth will be decreased or increased. It is equally obvious that the amount of set given the teeth will be decreased or increased accordingly.

It is also to be noted that the use of two stop members, one on either side of the saw, permits the tool to be operated in either direction.

Guiding means to hold the saw set in proper position on the saw and to regulate the depth to which the notches 5 will engage the teeth are carried at either end of spindle 6. These means comprise guide members 19 having downwardly and outwardly extending arms 20 and bolts 21 carried by the ends of arms 20. These bolts are provided at their lower end with enlarged portions adapted to slidably engage or ride upon the points of the saw teeth. By screwing or unscrewing the bolts 21, the plane of disk 4 may be accurately adjusted relatively to the plane of the saw on which the tool is being used. It is also to be noted that by adjusting both bolts 21 in unison the depth to which the notch 5 will engage the saw teeth can be regulated. Furthermore, by extending the bolts 21 in unison until they project substantially beyond the disk 4 the tool may be adjusted to operate on circular saws.

It is manifest that numerous changes or modifications in the construction or arrangement of the several parts of the device herein shown and described could be resorted to without departing from the spirit of my invention as disclosed in the appended claims.

Having thus described my invention, what I claim and desire to secure by Letters Patent is—

1. A saw set comprising a handle having a forked end forming arms, a spindle extending through said arms, a disk journaled on said spindle between said arms and having tooth engaging notches of various sizes formed on its periphery, means engageable with said notches to hold the disk in fixed positions relatively to said arms, adjustable stop members journaled on the spindle and extending outwardly in a manner to straddle a saw, and guiding means carried by the ends of said spindle to adjust the plane of the disk relatively to that of the saw.

2. A saw set comprising a handle having a forked end forming arms, a spindle extending through said arms, a disk journaled on said spindle between said arms and having tooth engaging notches of various sizes formed on its periphery, means engageable with said notches to hold the disk in fixed positions relatively to said arms, and guiding means carried by the ends of said spindle to adjust the plane of the disk relatively to that of the saw, said means comprising downwardly and outwardly extending arms provided at their outer ends with adjustable means to slidably engage the toothed edge of the saw.

3. In a saw set, a handle having a spindle, a turnable disk mounted on the spindle and having notches in its periphery, a pair of stop arms also turnably and independently mounted on the spindle and arranged to engage on opposite sides of a saw blade, and means between the handle and the respective stop arms to independently adjust the latter by turning thereof on the spindle.

4. A saw set including a handle having a forked end, a spindle transversely of the fork, a disk on the spindle having notches of different widths in its periphery, a pawl pivotally secured in the handle fork and adapted to engage the notches of the disk, stop members journaled on the spindle having slotted extensions, and screw bolts passing through the slots and into the handle.

5. In a saw set, a handle having a spindle saw setting means supported by the spindle a pair of independently adjustable stop means mounted on the spindle and disposed on opposite sides of the saw blade to control the set of the saw teeth, and a pair of guiding means also borne by the spindle and arranged to engage on top of the saw teeth and on opposite sides of the saw setting means.

6. A saw setting device including a forked handle, a spindle transverse to the fork, a notched disk mounted upon the spindle, a pawl pivoted to the handle and engaging the notches on the disk, stop member arms extending beyond the disk diameter upon each side of a saw blade, adjusting means thereon to limit the set of the saw teeth, and arms extending above and in the plane of the disk with adjustable members to contact with the saw teeth.

7. A saw set comprising a handle having a forked end forming arms, a spindle extending through said arms, a disk journaled on said spindle between said arms and having tooth-engaging notches of various sizes formed on its periphery, a pawl engageable with said notches to hold the disk in fixed positions relatively to said arms, stop members journaled on the spindle and extending outwardly in a manner to straddle a saw, and adjusting screws carried by said stop members to limit the set of the teeth.

8. In a saw set, a handle, saw setting means borne by the handle, guiding means borne by the handle and disposed on opposite sides of the saw setting means and formed to seat on top of the saw teeth, and means whereby to independently adjust said guiding means so as to vary the plane of the saw setting means and also to vary the distance between the teeth and the saw setting means.

9. In a saw set, a handle, saw setting means carried by the handle, a pair of stop members pivoted to the handle so that each can be adjusted independently of the other, and means to rigidly secure each member in its adjusted position.

In testimony whereof I have hereunto set my hand in the presence of two subscribing witnesses.

CHRESTEN TORBEN MADSEN.

Witnesses:
  W. W. HEALEY,
  M. E. EWING.

Copies of this patent may be obtained for five cents each, by addressing the "Commissioner of Patents, Washington, D. C."